United States Patent Office 3,065,199
Patented Nov. 20, 1962

3,065,199
COPOLYMERS OF AN UNSATURATED MONOMER AND AN UNSATURATED POLYESTER
Georges Collardeau and François Pierrot, Lyon, France, assignors to Societe des Usines Chimiques Rhone-Poulenc, Paris, France, a French body corporate
No Drawing. Filed Apr. 18, 1960, Ser. No. 22,684
Claims priority, application France Apr. 21, 1959
6 Claims. (Cl. 260—45.4)

This invention is for improvements in or relating to co-polymerisation processes and has for its object to provide new co-polymers, and compositions containing them, that have industrially valuable properties.

It is well known that the properties of polymers obtained from polymerisable ethylenic monomers containing at least one vinyl group $>C=CH_2$ can be modified by co-polymerising the monomer with polymerisable monomers of different chemical structure. In this connection, the co-polymerisation of the said ethylenic monomers with unsaturated polyesters has been proposed.

As the result of research and experimentation, it has now been found that new plastic materials possessing exceptional properties can be obtained by the co-polymerisation of unsaturated monomers containing at least one cinyl group $>C=CH_2$ and certain hitherto unknown unsaturated polyesters.

According to the present invention, a process for the production of plastic polymerisation products comprises the co-polymerisation of at least one monomer containing a vinyl group and an unsaturated polyester derived at least in part from cyclododeca-5,9-diene-1,2-diol or from cyclododecane-1,2-diol. By means of this process, there can be obtained plastic co-polymerisation products which possess, in contrast to co-polymerisation products derived from diols hitherto employed for the production of unsaturated polyesters, exceptionally interesting properties: more especially resistance to hydrolysis by water, or, in particular, aqueous alkaline solutions even under severe conditions of use that bring about complete hydrolysis of known polyesters.

The new polyesters employed according to the invention may be obtained by condensing an unsaturated dicarboxylic acid or its anhydride with cyclododeca-5,9-diene-1,2-diol or cyclododecane-1,2-diol or with the corresponding epoxide of either, namely 1,2-epoxycyclododeca-5,9-diene or 1,2-epoxycyclododecane. The said unsaturated diacid (or its anhydride) may be replaced in part by, i.e. employed in conjunction with, a saturated aliphatic or aromatic acid (or correspondings anhydride) and the said diols may be replaced in part by other diols, or compounds which form a diol under the conditions of the reaction, which may be aliphatic, cycloaliphatic or aromatic in character.

The cyclododeca-5,9-diene-1,2-diol, cyclododecane-1,2-diol, and the epoxides of each of these referred to above as starting materials for the production of the polyesters, may be obtained by various methods.

G. Wilke, in the publication Angewandte Chemie 69, 397 (1957), has shown that it is possible to trimerise butadiene to a liquid cyclododeca-1,5,9-triene of trans-trans-cis configuration and to a solid cyclododeca-1,5,9-triene, M.P. 34° C., of trans-trans-trans configuration. These two trienes can be converted to 1,2-epoxy-cyclododeca-5,9-dienes, the former into a liquid epoxide and the latter into a solid epoxide, M.P. 26–27° C.

By hydrolysis of the said epoxides by treatment with strong mineral acids, for example by treatment with aqueous sulphuric acid or an aqueous-acetone solution of perchloric acid, or by hydroxylation of the cyclododeca-1,5,9-trienes by treatment with an organic per acid, for example, by means of per-formic acid produced in situ by the action of hydrogen peroxide on formic acid, there are obtained the stereoisomeric forms of cyclododeca-5,9-diene-1,2-diols. Thus the trans-trans-trans-cyclododeca-1,5,9-triene and its monoepoxide yield a solid cyclododeca-5,9-diene-1,2-diol, M.P. 120.5–121° C., of which the phenylurethane derivative has M.P. 130–131.5° C. The trans-trans-cis-cyclododeca-1,5,9-triene and its monoepoxide yield a mixture of stereoisomeric diols from which can be isolated a cyclododeca-5,9-diene-1,2-diol, M.P. 158–159.5° C., of which the phenylurethane derivative has M.P. 157–258° C.

Cyclododecane-1,2-diol may be obtained by hydrogenation of one or other of the cyclododeca-5,9-diene-1,2-diols referred to above or by another method described by Prelog and Speck, Helvetica Chimica Acta, 38, 1786 (1955). The compound 1,2-epoxycyclododecane may be obtained by selective hydrogenation of the corresponding 1,2-epoxycyclododeca-5,9-diene, itself obtained according to the method of Wilke referred to above.

Unsaturated dicarboxylic acids which may be employed in producing the polyester materials employed in the present invention may be any of the known dicarboxylic acids containing ethylenic linkages, e.g. maleic or fumaric acids, which are generally of particular value, itaconic acid and homologues of maleic acid such as citraconic, mesaconic and glutaconic acids.

Saturated dicarboxylic acids which may be used in association with the unsaturated acids in the production of the polyesters include aliphatic dicarboxylic acids such as adipic acid and its higher and lower homologues, such acids containing substituent groups, e.g. halogen substituents, and aromatic dicarboxylic acids such as phthalic acid and its isomers and homologues and its substitution derivatives, e.g. those containing halogen substituents. Such saturated acids may constitute up to 90% of the total acids employed.

Other diols which may be employed in association with the diols and derivatives thereof referred to above, in the production of the polyesters include ethylene glycol and its homologues, di- and poly-ethers of such glycols, cycloaliphatic diols, alkyl-aromatic diols and diphenols. Such other diols may constitute up to 90% of the total diols employed.

In the production of the initial polyesters it is generally most convenient to employ substantially equimolecular proportions of the diacid or anhydride thereof, and the diol or epoxy derivative thereof, or to employ a slight excess of the latter. The esterification may be carried out in manner known per se. Thus for example, the epoxide may be heated with the diacid reactant, preferably in an atmosphere of an inert gas such as nitrogen or carbon dioxide. Water formed in the recation may be continuously eliminated in known way, e.g. by distillation or by azeotropic engagement using benzene or cyclohexane as the entraining liquid. The course of the esterification may be followed by measuring the quantity of water formed or by estimating hydroxyl or carboxyl groups. The viscosity may also be measured. The reaction is arrested by cooling when the polyester formation has proceeded to the desired extent.

It will be understood that in the aforesaid processes for the production of polyesters for use in the present invention any of the stereoisomers of the starting materials may be employed, pure or in admixture with other isomers.

As already set forth the present invention is concerned with the production of co-polymerisation products of polyesters as described above with polymerisable ethylenically unsaturated compounds containing at least one vinyl group, $>C=CH_2$. Particularly useful compounds containing vinyl groups are styrene, vinyl acetate and allyl phthalate. However any other polymerisable vinyl compound may be employed, for example the homologues and substitution products of styrene such as methylstyrene, vinylnaphthalene, and chlorostyrene, heterocyclic vinyl compounds such as vinylpyridine, other allyl esters such as allyl succinate, other vinyl esters such as vinyl butyrate, vinyl ethers, vinyl ketones and acrylic esters and nitriles.

To carry out the co-polymerisation the polyester is preferably dissolved in the polymerisable vinyl compound, usually a monomer, and preferably to a concentration of 50 to 80% of the polyester. If it is desired to store the solution an anti-oxidant such as hydroquinone should be added. The co-polymerisation may be effected by heating and/or by the addition of catalysts known for use in co-polymerisation reactions, e.g. organic peroxides or organic salts of heavy metals. The co-polymerisation may be effected at ordinary temperatures, i.e. at 15–30° C. but if a rapid co-polymerisation is desired the reaction mixture may be heated. Temperatures above 130° C. are, however, not generally necessary.

The co-polymers obtained are hard, infusible, only slightly coloured and insoluble in the usual solvents. Their exceptional resistance to alkali makes them particularly suitable for the production of containers for the chemical industry. Owing to their high resistance to hydrolysis the co-polymers are especially suitable for the production of laminates based on glass fabrics which are required to resist adverse weather conditions.

The following examples will serve to illustrate the production of co-polymers according to the invention, the methods for the production of the polyester materials also being described. The temperatures throughout are in degrees centigrade:

EXAMPLE I

Into a spherical flask provided with a column and a condenser are introduced 178 g. (1 mol) of 1,2-epoxy-cyclododeca-5,9-diene (obtained by the epoxidation of trans-trans-cis-cyclododeca-1,5,9-triene), 58 g. (0.5 mol) of maleic acid and 73 g. (0.5 mol) of adipic acid. The mixture is heated from ambient temperature to 175° over a period of 2 hours and is thereafter maintained at that temperature for a further 4 hours. Throughout the operation, a light current of nitrogen is maintained and benzene is continuously introduced at a rate of 60 cc. per hour. At the end of the operation, 16 g. of water (theoretically 18 g.) have been collected. The sum of the free carboxy and hydroxy groups in the product is equal to 15% of the initial value and the viscosity is 12.7 poises at 131°.

The product is allowed to cool to 145°, at which point 100 mg. of hydroquinone are added, and after further cooling to 120°, 194 g. of styrene are added. 486 g. of a mixture containing 40% by weight of styrene are thus obtained, having a density of 1.048, a viscosity of 3.2 poises, being transparent and having a slightly yellow coloration (2.5 on the Gardner scale). To this mixture are added 1% by weight of methyl ethyl ketone peroxide and 0.2% by weight of cobalt octoate (containing 6% by weight metallic cobalt) after which the mixture sets to a jelly in 70 to 80 minutes at 25°. When heated for 24 hours at 35° and then for 2 hours at 120°, it gives a solid, hard (40 Barcol), transparent copolymer having very little coloration. Discs of the copolymer 2 mm. thick treated for 24 hours at 95° with caustic soda (36° Bé.) swell by 0.95% and, after drying, show a weight loss of 2.36%. Under these conditions, a copolymer based on ethyleneglycol or propanediol is completely hydrolysed.

EXAMPLE II

There are introduced into a spherical flask 182 g. (1 mol) of 1,2-epoxycyclododecane and 116 g. (1 mol) of maleic acid. The procedure outlined in Example I is followed. After 5 hours, 17 g. of water (theoretically 18 g.) have been collected. The sum of the free carboxy and hydroxy groups in the product is equal to 14% of the initial value and the viscosity is 11 poises at 131°.

On cooling, 93 mg. of hydroquinone are added at 145°, and 186 g. of styrene are added at 120°. 465 g. of a mixture containing 40% by weight of styrene are thus obtained, having a density of 1.027, a viscosity of 1.2 poises, being transparent and having a pale yellow colour (4.5 on the Gardner scale).

On polymerisation as described in Example I, there is obtained a copolymer (Barcol hardness 41), of which discs 2 mm. thick treated for 24 hours at 95° with caustic soda (36° Bé.) swell by 0.21% and show a weight loss of 0.15% after drying.

EXAMPLE III

Into a spherical flask provided with a column and a condenser there is charged 98 g. (0.5 mol) of cyclododeca-5,9-diene-1,2-diol (M.P. 157–159°), 29 g. (0.25 mol) of maleic acid and 36.5 g. (0.25 mol) of adipic acid. The mixture is warmed to reach 175° in 30 minutes and is maintained at this temperature for 4½ hours. Throughout the whole operation a light current of nitrogen is maintained and benzene is continuously introduced at a rate of 120 cc. per hour for the first two hours. In this way, at the end of the operation substantially the whole of the water formed is recovered.

The mixture is allowed to cool and 50 mg. hydroquinone is added at 145° and 97 g. of styrene at 130°. There is thus obtained a solution containing 40% of styrene and 0.2% of hydroquinone, having a viscosity at 25° of 5.4 poises, a clear brown coloration, an acid index of 38 and a hydroxyl index of 27.

This mixture is catalysed by the addition of 1% of methyl ethyl ketone peroxide and 0.2% cobalt octoate (containing 6% by weight metallic cobalt). It sets to a jelly in 45 minutes at 25°. When heated for 15 hours at 25° and then for 3 hours at 120° it yields a hard transparent copolymer. Discs of the copolymer 2 mm. thick treated for 24 hours at 95° with caustic soda (36° Bé.) show, after drying, a loss in weight of only 2.5%.

The cyclododeca-5,9-diene-1,2-diol used in this example, and its isomer, which may equally be employed, may be prepared by any of the following procedures:

Procedure A

Sulphuric acid (66° Bé.) (39.2 g.) and water (156.8 g.) were mixed and maintained between 25° and 30°. To the mixture was added dropwise, with vigorous agitation, 1,2-epoxy-cyclododeca-5,9-diene (35.6 g.) prepared by epoxidation of trans-trans-cis cyclododeca-1,5,9-triene. When the addition was complete, the mixture was raised to 60° for 1 hour. Water (300 cc.) was then added and the product was heated for 1 hour at 90°, the agitation being continued. The crystals formed were suction-filtered and washed with cyclohexane, and the cyclohexane solution was neutralised by an addition of sodium carbonate.

There was thus obtained 23.5 g. of crystals, M.P. 138–145°, i.e. 60% of the theoretical yield. Evaporation of the cyclohexane produced a further 10.5 g. of oil.

Procedure B

A mixture of:

| | |
|---|---|
| 1,2-epoxy-cyclododeca-5,9-diene derived from trans-trans-cis cyclododeca-1,5,9-triene | 17.8 g. |
| Water | 18 g. |
| Acetone | 75 cc. |
| Perchloric acid (65%) | 1.54 g. (0.01 mol.) | was heated under reflux for 6 hours.

The temperature was maintained at 60–65°. After cooling, the crystals formed were filtered off, washed with cyclohexane and dried in vacuo at room temperature.

There were obtained: 14 g. of crystals, M.P. 154.5°–

156°, i.e. 72% yield; 1.15 g. of crystals, M.P. 127.5°–141°, i.e. 5.7% yield; 3 g. of residue.

Titration of the vicinal OH groups of the crystals with periodic acid indicated a cyclododecadiene-diol content of 95%. On recrystallisation of the diol (M.P. 154.5°–156°) from methyl ethyl ketone, the melting point was raised to 158°–159.5°.

*Procedure C*

A mixture consisting of:                            Parts by weight
1,2-epoxy-cyclododeca-5,9-diene obtained from
   trans-trans-trans cyclododeca-1,5,9-triene _____ 3.56
Water _____ 3.6
Perchloric acid (65%) _____ 0.308
Acetone _____ 15 was heated under reflux for 12 hours and the product was treated as in Procedure B. There were thus isolated 3.75 parts by weight of crystals, M.P. 120.5°–121°, i.e. a yield of 95%.

*Procedure D*

Trans-trans-cis cyclododeca-1,5,9-triene (16.2 g.) and 97% formic acid (100 cc.) were mixed and to the mixture there was added, with vigorous agitation, 32.5% hydrogen peroxide (10.4 g.) during a period of 10 minutes. The temperature rose from 23° to 40°. The product was maintained at 40° for 2 hours. The reaction mass was poured into 500 cc. of water and the aqueous solution was extracted with ether. The ethereal solution was neutralised with a sodium carbonate solution, the ether was distilled off and the residue was hydrolysed with a mixture of sodium hydroxide and alcohol. On dilution of the alcoholic solution with water, crystals were formed. There were thus isolated 3.95 g. of cyclododeca-5,9-diene-1,2-diol, M.P. 151–152°.

We claim:

1. A process for the production of plastic polymerisation products which comprises copolymerising with a monomer containing a $H_2C=C<$ group a copolymerisable linear polyester obtained by condensing (A) an acidic component selected from the class consisting of mono-olefinic aliphatic dicarboxylic acids and anhydrides thereof, mixtures of said mono-olefinic acids with saturated aliphatic dicarboxylic acids and mixtures of said mono-olefinic acids with aromatic dicarboxylic acids, with (B) at least one compound selected from the class consisting of 1,2-epoxycyclododecane, 1,2-epoxycyclododeca-5,9-diene, cyclododecane-1,2-diol and cyclododeca-5,9-diene-1,2-diol.

2. A process for the production of plastic polymerisation products which comprises copolymerising with styrene a copolymerisable linear polyester obtained by condensing (A) an acidic component selected from the class consisting of mono-olefinic aliphatic dicarboxylic acids and anhydrides thereof, mixtures of said mono-olefinic acids with saturated aliphatic dicarboxylic acids and mixtures of said mono-olefinic acids with aromatic dicarboxylic acids, with (B) at least one compound selected from the class consisting of 1,2-epoxycyclododecane, 1,2-epoxycyclododeca-5,9-diene, cyclododecane-1,2-diol and cyclododeca-5,9-diene-1,2-diol.

3. A process for the production of plastic polymerisation products which comprises copolymerising with vinylacetate a copolymerisable linear polyester obtained by condensing (A) an acidic component selected from the class consisting of mono-olefinic aliphatic dicarboxylic acids and anhydrides thereof, mixtures of said mono-olefinic acids with saturated aliphatic dicarboxylic acids and mixtures of said mono-olefinic acids with aromatic dicarboxylic acids, with (B) at least one compound selected from the class consisting of 1,2-epoxycyclododecane, 1,2-epoxycyclododeca-5,9-diene, cyclododecane-1,2-diol and cyclododeca-5,9-diene-1,2-diol.

4. A process for the production of plastic polymerisation products which comprises copolymerising with allyl phthalate a copolymerisable linear polyester obtained by condensing (A) an acidic component selected from the class consisting of mono-olefinic aliphatic dicarboxylic acids and anhydrides thereof, mixtures of said mono-olefinic acids with saturated aliphatic dicarboxylic acids and mixtures of said mono-olefinic acids with aromatic dicarboxylic acids, with (B) at least one compound selected from the class consisting of 1,2-epoxycyclododecane, 1,2-epoxycyclododeca-5,9-diene, cyclododecane-1,2-diol and cyclododeca-5,9-diene-1,2-diol.

5. A process for the production of plastic polymerisation products which comprises copolymerising with a monomer containing a $H_2C=C<$ group a copolymerisable linear polyester obtained by condensing (A) an acidic component selected from the class consisting of mono-olefinic aliphatic dicarboxylic acids and anhydrides thereof, mixtures of said mono-olefinic acids with saturated aliphatic dicarboxylic acids and mixtures of said mono-olefinic acids with aromatic dicarboxylic acids, with (B) at least one compound selected from the class consisting of 1,2-epoxycyclododecane, 1,2-epoxycylododeca-5,9-diene, cyclododecane-1,2-diol and cyclododeca-5,9-diene-1,2-diol, together with a diol selected from the class consisting of ethylene glycol and its homologues, di- and polyethers of such glycols, cycloaliphatic diols, alkyl aromatic diols and diphenols.

6. A copolymerisation product of a monomer containing a $H_2C=C<$ group and a copolymerisable linear polyester obtained by condensing (A) an acidic component selected from the class consisting of mono-olefinic aliphatic dicarboxylic acids and anhydrides thereof, mixtures of said mono-olefinic acids with saturated aliphatic dicarboxylic acids and mixtures of said mono-olefinic acids with aromatic dicarboxylic acids, with (B) at least one compound selected from the class consisting of 1,2-epoxycyclododecane, 1,2-epoxycyclododeca-5,9-diene, cyclododecane-1,2-diol and cyclododeca-5,9-diene-1,2-diol.

References Cited in the file of this patent

UNITED STATES PATENTS 2,255,313   Ellis _____ Sept. 9, 1941

FOREIGN PATENTS 1,022.09   France _____ Dec. 10, 1952

OTHER REFERENCES

Prelog et al.: "Helvetica Chimica Acta," 38, 1786 (1955).